United States Patent [19]

Taylor

[11] 3,898,313

[45] Aug. 5, 1975

[54] PRODUCTION OF IMPROVED CERAMIC SHELL MOULDS

[75] Inventor: Percy Ronald Taylor, La Hulpe, Belgium

[73] Assignee: Monsanto Ltd., London, England

[22] Filed: Oct. 12, 1973

[21] Appl. No.: 405,949

[30] Foreign Application Priority Data

Oct. 18, 1972 United Kingdom............... 48006/72

[52] U.S. Cl. .................... 264/225; 264/60; 264/63; 264/134; 264/241

[51] Int. Cl.². B32B 7/04; B32B 19/02; C04B 35/00

[58] Field of Search ....... 264/60, 63, 219, 220, 221, 264/225, 226, 227; 106/67, 71, 72; 164/26, 361

[56] References Cited
UNITED STATES PATENTS

| | | | |
|---|---|---|---|
| 2,806,270 | 9/1957 | Shaul .................................. | 164/26 |
| 3,445,250 | 5/1969 | Preece ............................... | 264/221 |
| 3,764,355 | 10/1973 | Moore ................................. | 106/67 |

FOREIGN PATENTS OR APPLICATIONS

| | | | |
|---|---|---|---|
| 1,023,829 | 3/1966 | United Kingdom................... | 164/26 |

OTHER PUBLICATIONS

Data for Sieves, pages 3,064, 3,065.

*Primary Examiner*—Donald J. Arnold
*Assistant Examiner*—John Parrish
*Attorney, Agent, or Firm*—William H. Duffey

[57] ABSTRACT

Improved ceramic shell moulds are produced by applying to a disposable pattern an alkaline refractory slurry, an acidic refractory slurry, a dry stucco coating having determined particle size distribution, gelling the primary coating and thereafter applying a succession of secondary coatings with intermediate stuccos, drying the mould, removing the pattern and firing the mould.

5 Claims, No Drawings

PRODUCTION OF IMPROVED CERAMIC SHELL MOULDS

This invention relates to a process for the production of a ceramic shell mould, more particularly to a process which provides an improved primary layer in such a mould.

The use of ceramic shell moulds for metal casting has been known for many years. The basic procedure for the production of ceramic shell moulds comprises applying to a pattern of the article to be reproduced a succession of coatings of a slurry of a particulate refractory material in a liquid binding agent, each coating being given a "stucco" of relatively coarse refractory particles, and the binding agent being gelled to set the coating, before the application of the next.

After a shell of sufficient thickness has been built up, the coated pattern is dried. The pattern itself is made of a material such as wax which can be removed from the shell by melting or dissolving out, and the next stage in the production of the mould is the removal of the pattern. The mould thus obtained is then heated in a furnace at a sufficiently high temperature to convert the material of the shell to high strength ceramic. Usually metal is cast into the mould shortly after its removal from the furnace.

The production of castings having a defect-free, high surface finish requires the inner surface of the mould, derived from the first coating of slurry applied to the pattern, to be as smooth, uniform and as dense as possible without being impermeable. The typical conventional process seeks to provide such a surface by using for the first coating a slurry having a high loading of a fine-particle, close-packing refractory filler, and a primary stucco refractory of fine grading and good packing characteristics.

The required objectives are not always met in the conventional process, however. Thus, it is virtually impossible to achieve uniform application of a slurry coating of the desired thickness by the usual techniques of dipping and draining, or spraying, even when the slurry is of thixotropic character. Extended draining periods and manipulation after dipping can result in a somewhat more uniform slurry coating, but the disadvantages of this practice include (i) the slurry coating may be undesirably thin over a large area of the pattern surface and (ii) the risk of premature drying of the coating skin before the application of the stucco. Condition (i) predisposes to the incidence of "penetration" (plus metal) defects where the packing configuration of the applied stucco particles is least dense. Condition (ii) causes inadequate adhesion of the subsequently applied stucco with resultant risk of mould inclusion defects in the cast metal.

The use of primary stucco refractory of fine grading and good packing characteristics involves the risk of providing inadequate keying to, and possible subsequent delamination from, the first back up coat, particularly in areas where the primary slurry coating has accumulated and is relatively too thick. Conversely, the use of coarser stucco with good keying and less dense packing characteristics produces undesirable discontinuities (gross voidage) in the primary coating where the slurry layer is of inadequate thickness. The gross voidage predisposes the mould to produce penetration defects on the surface of the cast metal.

The present invention provides a process whereby a thicker primary coating than normal can be applied to the pattern in a time not substantially greater than that required to apply the primary coating in the conventional process. The increased thickness results in a marked reduction in metal penetration defects in castings. It also permits the use of grades of primary stucco which provide good keying for the first back up coat but without the disadvantages sometimes associated with the use of such grades.

The process of the invention is one for the production of a ceramic shell mould which comprises forming a primary coating on a disposable pattern by applying to the pattern a coat of a first slurry of a refractory filler in a liquid binding agent, and applying to the said coat, without an intermediate stucco, a coat of a second slurry of a refractory filler in a liquid binding agent, one of the slurries being acidic and the other alkaline, and then applying to the thus-coated pattern a dry stucco of a refractory material in which 50 percent or more by weight of the particles have a particle size equal to or greater than the average thickness of the thus-formed primary coating, gelling the primary coating, and thereafter, in known manner, applying a succession of secondary coatings with intermediate stuccos until a shell of the required thickness has been built up, drying the mould, removing the pattern and firing the mould.

In a preferred manner of operating using a wax pattern, the first slurry is alkaline and the second slurry is acidic.

The average thickness of the primary coating can be determined by making one or more prototype moulds using first and second slurries containing an inert pigment or other material which, in the finished mould, will impart a visual difference between the primary coating and the generally white appearance of the conventional ceramic material forming the rest of the mould. Certain coloured oxides can be used, for example, or compounds which during the firing of the mould are converted to coloured oxides, for example copper and cobalt nitrates.

The stucco applied to the primary coating in a prototype mould will normally be a conventional primary coating stucco, which will not necessarily meet the requirements of the present invention.

The completed prototype mould after firing and cooling is carefully sectioned, and the thickness of the coloured inner layer can be measured on a range of samples from different parts of the mould using a microscope fitted with a calibrated graticule. The number of samples to be taken to obtain an accurate measure of the average thickness of the primary coating will vary with the geometric complexity of the pattern. Shrinkage of the ceramic during firing is minimal, and it can be assumed that the average thickness of the primary coating determined by the above method is substantially that of the primary coating to which the primary stucco is applied during mould formation.

The liquid binding agent of the alkaline slurry is preferably an alkali-stabilised aqueous silica sol. Many such sols are available commercially, most having a pH in the range 9 to 11. The silica content of such sols may vary from, for example, 15 to 55 percent by weight. Preferred sols for use in the present invention are those having silica concentrations of from 20 to 40 percent by weight. The alkali-stabilised aqueous silica sols are available in a range of different particle sizes corresponding to a specific surface area of, for example, from 70 to 350 square metres per gram of silica when determined by the method described in Anal. Chem. 28, 1981, (1956). In the present invention it is preferred to use small particle size sols having a specific surface area of at least 150 square metres per gram, for example from 200 to 300 square metres per gram. Good results have been obtained using the silica sol sold by Monsanto as Syton X30 which is a sol having a pH of from 9.6–10.0, a silica concentration of about 30 percent by weight, and a silica particle size corresponding to a specific surface area of approximately 250 square metres per gram.

Alternatively, a dilute sodium silicate solution may be used as the binding agent in the alkaline slurry.

The liquid binding agent of the acidic slurry is preferably a solution obtained by the hydrolysis of an alkyl silicate, which may be an alkyl orthosilicate or alkyl polysilicate, using an acidic hydrolysis catalyst. The use of such hydrolysed alkyl silicate solutions as binding agents for refractory fillers is well known.

The hydrolysis of the alkyl silicate is usually carried out in the presence of a mutual solvent for the water and the alkyl silicate. A variety of water-miscible solvents can be used, for example water-miscible alcohols, glycols or ketones, but the solvent most frequently employed in practice is ethanol. The quantity of solvent is normally selected to give a product having an $SiO_2$ content of from 10 to 25 percent by weight of silica. The quantity of water used may be sufficient for the complete hydrolysis of the alkyl silicate, but satisfactory binding agents are obtained where the hydrolysis is only partial, using for example 50 to 90 percent of the amount of water theoretically required for complete hydrolysis. Hydrochloric acid and sulphuric acids are the acid catalysts most frequently employed. The amounts used are preferably such as to give a binder solution having a pH in the range 1 to 3. A silica sol may be used as the source of the water for the hydrolysis.

A solution which gives good results in the present process can be prepared by adding an ethyl polysilicate having an $SiO_2$ content of 40–42 percent by weight to aqueous ethanol acidified with hydrochloric acid, the latter being used in an amount of from 0.05 to 0.5 ml of concentrated acid per 100 ml of reaction mixture. Another acidic binding agent solution which can be used is obtained by adding an ethyl polysilicate having a silica content of 40–42 percent by weight to a dispersion of colloidal silica particles in acidified aqueous ethanol, the said dispersion being prepared by mixing ethanol, a silica aquasol and sulphuric acid, and the relative quantities employed being such that the binder liquid contains from 10 to 25 percent by weight of silica, of which from 18 to 44 percent by weight is derived from the silica aquasol, and the acidity of the binder liquid is from 0.003 to 0.05N. Such binder liquids are described and claimed in British Patent Specification No. 1,309,915.

Alternatively the acidic liquid binding agent used in the process of the invention can be an acidic silica sol. Acidic silica aquasols are reasonably stable at pH values in the range 1 to 4 especially in the range 2 to 2.5, and can be obtained by the addition of the requisite amount of, for example, sulphuric or hydrochloric acid, preferably in concentrated form, to a commercial alkali-stabilised silica sol. Silica sols in which the dispersion medium is alcohol or aqueous alcohol may also be used.

The refractory filler used in each slurry coat in the process of the present invention is generally selected from the same materials that are used as primary coating fillers in established processes for the manufacture of ceramic shell moulds. These materials include for instance zircon, various forms of silica including fused silica, and alumina. The particle size of primary coating fillers is less than 100 microns, and typically 30 percent by weight of the filler has a particle size less than 15 microns, and 65 percent by weight has a particle size in the range 15 to 70 microns. The concentration of zircon powder of this particle size range in slurries having the preferred viscosity ranges referred to below is about 4 kilograms per litre of binder liquid.

The slurries used in the process of the present invention may contain such additional ingredients as are customarily included in slurry formulations used in the manufacture of ceramic shell moulds, for example wetting agents and antifoaming agents. Where the pattern is made of wax or other hydrophobic material, the presence of a wetting agent in the slurry to be used for the first coat is highly desirable if the slurry is water-based. Ionic or non-ionic wetting agents may be used, examples of the former being the alkali metal $C_{12-24}$ alkyl sulphates and the alkali metal sulphosuccinates, and examples of the latter being the condensation products of ethylene oxide with nonylphenol or octylcresol. Aliphatic alcohols having from 6 to 12 carbon atoms per molecule, for example n-octanol or 2-ethylhexanol, can be used as antifoaming agents.

Examples of other ingredients which may be included in the slurries are materials which, when present in the cavity surface of the mould, promote or catalyse the nucleation of a metal or alloy cast into the mould, thus forming a casting having a desirable, uniform fine grain structure. For example certain cobalt and nickel compounds, for instance cobalt oxide, aluminate and silicate, and nickel oxide and carbonate, are effective nucleation catalysts, especially for alloys based on iron, nickel, cobalt, chromium or copper.

The slurries can also contain deoxidizing agents such as finely-divided carbon or organic resinous materials, which when present in the mould surface, protect the surface of a casting made in the mould from oxidative deterioration during cooling.

Because the technique of the present invention results in a thicker and more uniform primary coating than conventional mould building procedures, it is possible to obtain a more uniform distribution of any additive and also to introduce larger quantities of the additive into the primary coating without increasing the concentration of the additive in the slurry. Such uniformity of distribution is of especial significance where the additive is a nucleation catalyst.

Certain additives may have a slight destabilising effect on the slurries, but this is not a feature peculiar to the present invention, and such safeguards as are customary when using slurries containing such additives in conventional mould-building processes, should be applied.

The thickness of the slurry coats forming the primary coating in the process of the invention is largely dependent on the viscosities of the slurries. Viscosity modifiers such as water-soluble cellulose derivatives may be included but it is preferred to optimise viscosities solely by variations in the filler and its concentration. The optimum will depend, inter alia, on the geometry of the pattern, but in general, it is preferred that the first slurry should have a viscosity, measured using a B4 flow cup (B.S.S. 1733), of from 70 to 130 seconds, especially of from 80 to 110 seconds. The viscosity of the second slurry may lie within the same range, but less viscous slurries are also suitable having viscosities down to, for example, 20 seconds.

Where, as is usual, the slurry coats are applied by dipping, the pattern carrying the first coat should generally be held in the second slurry for no longer than is necessary to form a complete and continuous second coat. This time will vary, e.g. with the viscosity of the second slurry and the complexity of the pattern, but will normally be from 0.5 to 5 seconds. The optimum time is readily established by simple experimentation.

A critical feature of the process of the present invention is the particle size of the stucco applied to the primary coating. As indicated above, a majority of the particles of the stucco should be of a size equal to or greater than the average thickness of the primary coating. It is believed that gelation of the binding agents occurs rapidly at the interface of the first and second coats, so that penetration of the stucco particles into the first coat occurs only to a limited extent (that such penetration occurs, can, however, be beneficial in bonding the second coat to the first) when the stucco is applied by the usual methods of suspending the coated pattern in a fluidised bed of the stucco material, or in the stream of a "raining" device. The requirement that a majority of the particles of the stucco should have a major dimension greater than the thickness of the primary is therefore sufficient to ensure that the stucco acts as a good key for the first of the secondary coatings applied subsequently. Thus the grading distribution of the stucco should be such that although there may be packing and some submersion of stucco particles in the primary coating, an adequate volume of stucco remains projecting above the coating to provide efficient keying with the next-applied secondary slurry.

The same mechanism, namely the rapid formation of a layer of gelled binding agent at least at the interface of the first and second slurry coats, is believed to explain why in the present process the number of stucco particles passing through to the pattern surface and hence the incidence of penetration defects, is much reduced.

It will be understood that considerable variations in the particle size and particle size distribution of the stucco are possible, depending, inter alia, on the thickness of the slurry coats. However, it is found that slurries having the viscosities referred to above applied by conventional dipping and draining techniques, generally give a combined first and second slurry coat average thickness within the range 100 to 400 microns. The particle size of the stucco is selected accordingly. For instance where the average slurry coat thickness is 100 microns, one uses a stucco having at least 50 percent by weight of the particles greater than 100 microns and where the average slurry coat thickness is 400 microns, one uses a stucco having at least 50 percent by weight of the particles greater than 400 microns.

Preferably the particle size distribution of the stucco lies within a range of from ½ to 5 times the average primary coating thickness (provided that least 50 percent by weight of the particles have a particle size equal to or greater than the primary coating thickness), and preferably the particle size distribution lies within a range from a size substantially equal to the primary coating thickness to 3 times the primary coating thickness. Preferably the stucco is substantially free from particles larger than 1 mm and smaller than 100 microns, and more preferably the stucco has a particle size distribution within the range 600 to 150 microns. The optimum particle size will depend on particle shape, but materials having the grading distribution designations 30–80 and 60–80 which have respectively particle size ranges of from about 180 to about 500 microns, 75 percent by weight being in the range 300 to 480 microns, and from about 150 to about 280 microns, 90 percent by weight being in the range 190 to 240 microns, have been found to be especially suitable in the present process.

A considerable range of materials can be employed as the stucco, for example various forms of silica and alumina, aluminium silicates such as sillimanite, and fireclay grog. It is preferred that the stucco material should have highly angular particles, and certain calcined kaolin clays are particularly suitable in this respect.

Following the application of the stucco, gelation of the primary coating is substantially complete after a comparatively short drying period. It can however be accelerated by exposure of the outer coat to an appropriate acidic or alkaline vapour. For example, where the second slurry is acidic, the gelation of the binding agent can be accelerated by exposure to ammonia.

The invention is illustrated by the following Example.

EXAMPLE

The pattern used was made of wax and had in it a slot 130 mm long, 8 mm wide and 30 mm deep. The provision of an adequate primary coating thickness over the surface of the slot proved impossible using a conventional primary coating technique, with the result that castings made in the finished conventionally-produced shell moulds showed severe metal penetration defects particularly in the base of the slot where heat concentration after casting was greatest.

In applying the process of the present invention to this pattern, the pattern was first dipped in an alkaline slurry of zircon powder in an alkaline silica aquasol (Syton X30), the zircon powder having a particle size mainly in the range 70 microns to 15 microns and being present in an amount such that the slurry gave a B.S.S. 1733 B4 flow cup reading of 100 seconds. The slurry also contained a non-ionic surfactant (an octylphenyl ester of a polyethylene glycol) in a concentration of 0.5 volume percent, and n-octanol (antifoaming agent) in a concentration of 1.0 volume percent, based on the alkaline silica aquasol. After a brief manipulation and draining period, the pattern was dipped for about 3 seconds in an acidic slurry of the same zircon powder material in a liquid binding agent prepared by the acid-catalysed hydrolysis of an ethyl polysilicate in a medium consisting largely of ethanol. The binding agent had an $SiO_2$ content of approximately 20 percent by weight, and the slurry had a B.S.S. 1733 B4 flow cup reading of 75 seconds. After a further brief manipulation and draining period, Molochite (a calcined kaolin clay) stucco grade 30/80 was applied to adhere as densely as possible all over the slurry surface. The particle size range of this grade of stucco was from 180 to 500 microns, with 75 percent by weight in the range 300 to 480 microns. The coating was allowed to dry and harden in air for 1 hour.

Building of the shell was continued by applying conventional secondary back-up coats, and the mould was dewaxed and fired in known manner.

The castings subsequently made were completely free of penetration or other defects in the slot surface although the casting trial had been made extra severe by employing a metal pouring temperature 30°C. hotter than normal.

Particle sizes in the Example and elsewhere in the specification refer to particle sizes as determined by sieve analysis.

The embodiments of this invention in which an exclusive property or privilege is claimed are defined as follows:

1. In a process for the production of a ceramic shell mould be applying an alternating series of acidic and alkaline refractory slurry coating to a disposable pattern, drying the mould, removing the pattern and firing the mould, the improvement which comprises applying to said pattern a coat of a first slurry of a refractory filler in a liquid binding agent, and applying to said coat, without an intermediate stucco, a coat of a second slurry of a refractory filler in a liquid binding agent, one of the two slurries being acidic and the other alkaline, the binding agent for said acidic slurry being a solution of an acid-catalyzed, hydroliyzed alkyl silicate and the binding agent for said alkaline slurry being an alkali-stabilized aqueous silica sol, and then applying to the thus-formed primary coating a dry stucco of a refractory material in which 50 percent or more by weight of the particles have a particle size equal to or greater than the average thickness of said primary coating.

2. The process of claim 1 in which the first slurry is alkaline and the second slurry is acidic.

3. The process of claim 1 in which the particle size distribution of the stucco applied to the primary coating is within a range of from ½ to 5 times the average primary coating thickness.

4. The process of claim 3 in which the stucco material has a particle size range of from about 180 to about 500 microns, 75 percent by weight being in the range 300 to 480 microns or a particle size range of from about 150 to about 280 microns, 90 percent by weight being in the range 190 to 240 microns.

5. The process of claim 3 in which the stucco applied to the primary coating has a particle size distribution within the range 600 to 150 microns.

* * * * *